United States Patent [19]
Chopping et al.

[11] Patent Number: 5,710,759
[45] Date of Patent: Jan. 20, 1998

[54] SWITCH PROTECTION ARRANGEMENT

[75] Inventors: Geoffrey Chopping, Wimborne; Andrew James Barker, Attenborough; David Paul Stoney, Stapleford, all of United Kingdom

[73] Assignee: GPT Limited, Coventry, United Kingdom

[21] Appl. No.: 495,469

[22] PCT Filed: Jan. 26, 1994

[86] PCT No.: PCT/GB94/00152

§ 371 Date: Dec. 8, 1995

§ 102(e) Date: Dec. 8, 1995

[87] PCT Pub. No.: WO94/17614

PCT Pub. Date: Aug. 4, 1994

[30] Foreign Application Priority Data

Jan. 27, 1993 [GB] United Kingdom ............... 9301575

[51] Int. Cl.⁶ .................................................. H04J 1/16
[52] U.S. Cl. ..................................... 370/244; 370/248
[58] Field of Search ........................... 370/13, 94.1, 60.1, 370/14, 17, 216, 217, 218, 219, 214, 242, 244, 245, 247, 248, 250, 251, 360, 384, 389, 396, 503, 507; 371/5.1, 5.4, 37.1, 42, 47.1, 201, 204, 205, 24, 27; 375/213, 356, 355

[56] References Cited

U.S. PATENT DOCUMENTS 5,500,851 3/1996 Kozaki et al. ........................ 370/13
5,524,106 6/1996 Tremel et al. ........................ 370/13

FOREIGN PATENT DOCUMENTS 0477553 4/1992 European Pat. Off. .
0511671 11/1992 European Pat. Off. .
2261137 5/1993 United Kingdom .

Primary Examiner—Douglas W. Olms
Assistant Examiner—Dang Ton
Attorney, Agent, or Firm—Spencer & Frank

[57] ABSTRACT

A telecommunication switch protection arrangement has information sent in the form of an information frame through a switch. The information in the frame is reorganized in the switch between input and output and checked for parity by using a V4 byte in the frame before being sent from the switch.

8 Claims, 2 Drawing Sheets

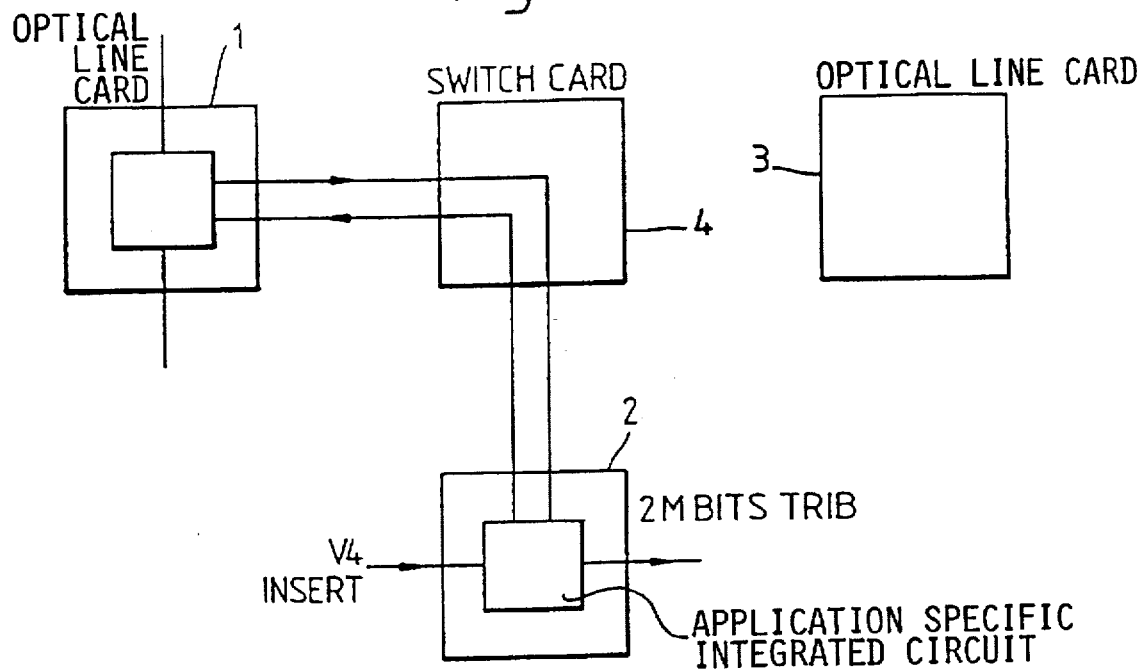
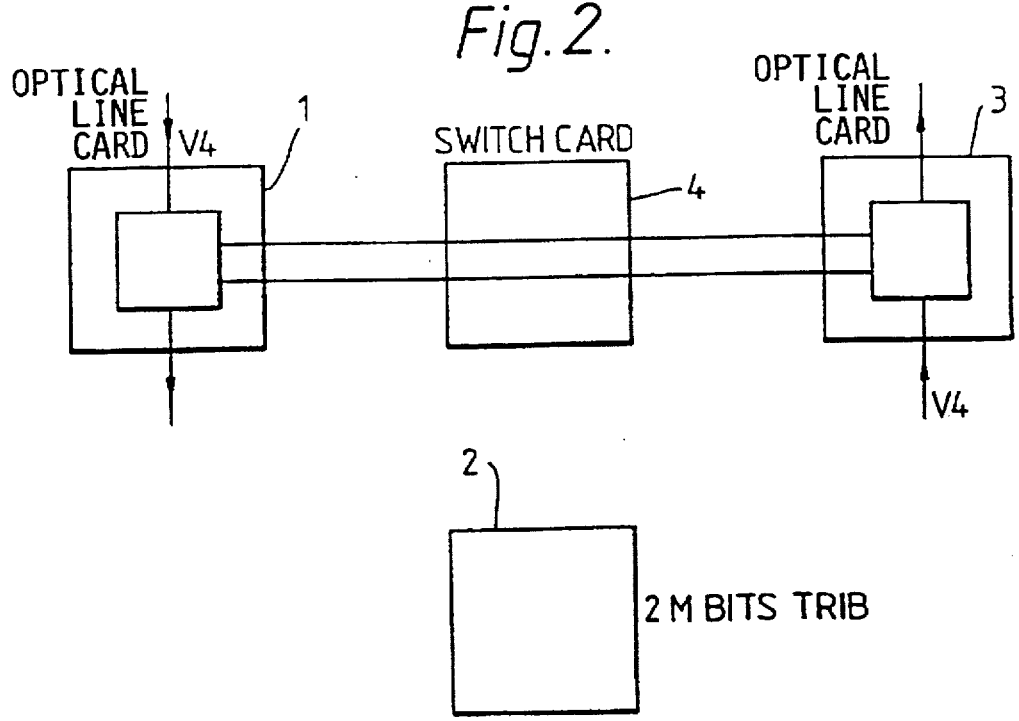

Fig. 3.

SECTION OVERHEAD BYTES

| | 1 | 2 | 3 | 4 | 5 | 6 | 7 | 8 | 9 |
|---|---|---|---|---|---|---|---|---|---|
| 1 | | A | A | A | | | | | |
| 2 | | B | B | B | | | | | |
| 3 | | C | C | C | | | | | |
| 4 | | | | | AU POINTERS | | | | |
| 5 | | | | | 1/1 | 1/2 | 1/3 | 1/4 | |
| 6 | | | | | 3/1 | 3/2 | 3/3 | 3/4 | |
| 7 | | | | | 2/1 | 2/2 | 2/3 | 2/4 | |
| 8 | | | | | 4/1 | 4/2 | 4/3 | 4/4 | |
| 9 | | | | | W | | | | |

X/Y
X-TUG-22
Y-TUG-31
W-STM-1/AU-4

BYTE STRUCTURE

| 1 | 2 | 3 | 4 | 5 | 6 | 7 | 8 |
|---|---|---|---|---|---|---|---|
| SF1 | SD1 | SF2 | SD2 | SF3 | SD3 | SF4 | SD4 |

TU-12×1  TU-12×2  TU-12×3  TU-12×4
TU-31

SF-SIGNAL FAIL FLAG
SD-SIGNAL DEGRADE FLAG

W BYTE STRUCTURE

| 1 | 2 | 3 | 4 | 5 | 6 | 7 | 8 |
|---|---|---|---|---|---|---|---|
| SF1 | SD1 | SF2 | SD2 | SF3 | SD3 | SF4 | SD4 |

STM-1  AU-4

SWITCH DIAGNOSTIC MESSAGE
(FOR AU-4 OR TU-31's)
B-SHELF NUMBER AND BOARD NUMBER
C-CHANNEL NUMBER
A-PARITY ON AU-4 OR TU-31

Fig. 4.

SECTION OVERHEAD BYTES

| | 1 | 2 | 3 | 4 | 5 | 6 | 7 | 8 | 9 |
|---|---|---|---|---|---|---|---|---|---|
| 1 | | A | A | A | | | | | |
| 2 | | B | B | B | | | | | |
| 3 | | C | C | C | | | | | |
| 4 | | | | | AU POINTERS | | | | |
| 5 | | | | | 1/1 | 1/2 | 2/1 | 2/2 | 2/3 |
| 6 | | | | | 4/1 | 4/2 | 4/3 | 5/1 | 3/1 |
| 7 | | | | | 7/1 | 7/2 | 7/3 | | 6/1 |
| 8 | | | | | W | | | | 3/2 |
| 9 | | | | | | | | | 6/2 |

| | 1 | 2 | 3 | 4 | 5 | 6 | 7 | 8 | 9 |
|---|---|---|---|---|---|---|---|---|---|
| 1 | | A | A | A | | | | | |
| 2 | | B | B | B | | | | | |
| 3 | | C | C | C | | | | | |
| 4 | | | | | AU POINTERS | | | | |
| 5 | | | | | 1/1 | 1/2 | 2/1 | 2/2 | 2/3 |
| 6 | | | | | 4/1 | 4/2 | 4/3 | 5/1 | 5/2 |
| 7 | | | | | 7/1 | 7/2 | 7/3 | | |
| 8 | | | | | W | | | | |
| 9 | | | | | | | | | |

X/Y
X-TUG-21
Y-TUG-32
W-STM-1/AU-4/AU-32

BYTE STRUCTURE

| 1 | 2 | 3 | 4 | 5 | 6 | 7 | 8 |
|---|---|---|---|---|---|---|---|
| SF1 | SD1 | SF2 | SD2 | SF3 | SD3 | SF4 | SD4 |

TU-11×1  TU-11×2  TU-11×3  TU-11×4
TU-12×1  TU-12×2  TU-12×3
TU-21
TU-32

SF-SIGNAL FAIL FLAG
SD-SIGNAL DEGRADE FLAG

W BYTE STRUCTURE

| 1 | 2 | 3 | 4 | 5 | 6 | 7 | 8 |
|---|---|---|---|---|---|---|---|
| SF1 | SD1 | SF2 | SD2 | SF3 | SD3 | SF4 | SD4 |

STM-1  AU-32×1  AU-32×2  AU-32×3
AU-4

SWITCH DIAGNOSTIC MESSAGE
(FOR AU-4/32 OR TU-32's)
B-SHELF NUMBER AND BOARD NUMBER
C-CHANNEL NUMBER
A-PARITY ON AU-4/32 OR TU-32

SWITCH PROTECTION ARRANGEMENT

BACKGROUND OF THE INVENTION

This invention relates to a switch protection arrangement in or for a switching network and in particular to a synchronous digital hierarchy system (SDH) in which information is carried in bit form in a framework in which the framework comprises a plurality of bytes of information each byte comprising in turn a plurality of bits in serial form. The bytes in the framework are assigned titles and references depending on their situation in the framework and the structure of the framework is defined in accordance with standards such as CCITT (now ITU) specification G708 and G709. Within the framework certain bytes are allocated to the path overhead frame and others to the section overhead frame for data transmission purposes.

In order to ensure correct functioning of the switch information, the information to the input of the switch is re-arranged and presented to the output. In this re-arrangement the data may be re-written and be corrupted or misrouted and it is an object of the present invention to check for parity of information between the input and the output of the switch.

SUMMARY OF THE INVENTION

EP-A-0 477 553 discloses an apparatus for testing ATM switches by inputting a test cell to an ATM channel at a free cell timing on an input highway. Test cell detectors are provided in the switches forming the ATM channel for detecting if the test cell has been correctly switched in accordance with a switch path information written in the cell.

According to the present invention a telecommunications switch protection arrangement includes a switch including switch paths, means for establishing switched connections, a plurality of interface cards which include the capability of generating and monitoring multiple test data fields and reporting any discrepancies found, the format of a switched connection including a test data byte which is reserved for transporting a multiplicity of different test data fields which are used to assist in the determination of whether the switch paths are routed and operating correctly, and wherein the contents of the data fields comprise data which is characteristic of the originating interface cards and of the channel used by the switched connection to enter the switch.

According to the present invention a switch protection arrangement includes a switch, means for establishing switched connections, a plurality of interface cards which include the capability of generating and monitoring multiple test data fields and reporting any discrepancies found, the format of a switched connection including a test data byte which is reserved for transporting a multiplicity of different test data fields which are used to assist in the determination of whether the switch paths are routed and operating correctly, and wherein the contents of the data fields comprise: a multiframe synchronisation pattern; a plurality of parity check bits generated from the data carried by that switched connection; the number of the shelf containing the originating interface card of the switched connection; the number of a card position containing the originating interface card; the type number of the originating interface card; and the channel number used by the switched connection to enter the switch.

Means may be provided to distribute data to the interface card at the destination of a switched connection; the data containing: the shelf number; the card number; the card type; and the channel number of the source of a switched connection.

Means may also be provided to inhibit the reporting of some or all of the detected discrepancies.

The test data byte is preferably the V4 byte of an SDH tributary.

It is preferred that TU½ structured data utilises the V4 byte of the associated path overhead. TU3/AU4 structured data utilises bytes within the section overhead of the frame.

A glossary of terms used in this specification and the drawings appears in an Appendix at the end of the specification.

The detailed description following is specific to the TU12 checking mechanism. The same principle of checking is utilised for TU11, TU2, TU3 and AU4. The TU11 and TU2 also use the V4 byte. The TU3 and AU4 use bytes in the section overhead.

Reference will now be made to the four figures of the accompanying drawings to illustrate two embodiments for the use of the invention.

BRIEF DESCRIPTION OF THE DRAWINGS

FIG. 1 is an example of a configuration which uses an optical line card to a tributary system FIG. 2 is a system using an optical line card to an optical line card system.

FIG. 3 and FIG. 4 illustrate the location of flags within the SOH for protection.

DETAILED DESCRIPTION OF THE INVENTION

Referring now to the drawings, it is to be understood that the same principles apply to both FIGS. 1 and 2. A standard framework of information is set up and the V4 byte is monitored.

In the system the V4 monitoring is a monitoring system designed to check the connectivity and integrity of the data paths established through the Switch Card(s).

In each TU-12 generated internally by an ADMX the V4 Byte contains information about the 'originator' of the TU, and by comparing the received V4 Byte with a record of the 'expected' V4 (configured by the Mux controller) the 'destination' card monitors the integrity of the TU path.

The V4 Monitoring is used by the ADMX to detect Switch Card failures and, when dual protected Switch Cards are provided the information from the V4 monitoring is used by the Switch Card Protection System to determine which Switch Card (A or B) to use.

The V4 monitoring only operates within the ADMX. The 'external' V4 bytes in the STM-1 going to Line (or STM-1 Tribs) are not specified by the CCITT standard used and are set to all 1 or all 0.

The V4 Monitoring is an inherent feature of the ADMX (in all configurations) and it is not possible for the Operator to disable it.

The ADMX may be physically equipped and configured in a number of ways. The Line Cards are always STM-1 Cards. The Trib Cards however may be 2Mb/s or STM-1 giving the following possible path connections.

Trib (2Mb/s) - Switch - Line (STM-1)
Trib (STM-1) - Switch - Line (STM-1)
Line (STM-1) - Switch - Line (STM-1)
Trib (2Mb/s) - Switch - Trib (STM-1)

-continued

Trib (2Mb/s) - Switch - Trib (2Mb/s)
Trib (STM-1) - Switch - Trib (STM-1)

In the example of FIG. 1 the cards are arranged as an Optical Line Card (STM-1) to a Trib (2Mb/s) card.

The V4 Monitoring occurs between an Optical Line Card 1 and Trib Card 2. In this configuration the integrity of a path set up to terminate a VC-12 can be monitored. The TU's are monitored in both directions simultaneously through the Switch.

In the 'Transmit' direction the Trib Card (the originator) inserts the V4 Byte in each TU and is monitored on the optical Mux Card (the destination card).

In the 'Receive' direction the Optical Mux (the originator) inserts the V4 Byte and is monitored by the Trib cards (the destination card).

The V4 Byte is (under normal working) passed transparently through the Switch.

In the second example the Optical Line Card (STM-1) transfers to another Optical Line Card (STM-1) as shown in FIG. 2. TU-12, TU-2, TU-3 and AU-4 can be routed through the Switch, the V4 Monitoring however is only applicable to the TU12's and TU2's as path overheads. TU3 and AU4 utilise bytes within the section overhead. See FIGS. 3 and 4.

In FIG. 2 the V4 Monitoring between two Optical Line Cards 1 and 3 via a Switch Card 4 takes place. In this configuration the integrity of Paths set up to pass a VC 'through' the ADMX is monitored.

The TU's are monitored in both directions through the Switch. The V4 Byte is (under normal working) passed transparently through the Switch.

The V4 Byte is inserted into each TU-12 by the Mapping ASIC on the Tributary Card and by the Re-Justifier ASIC on the Optical Line Card.

The V4 Byte of each TU-12 contains over a period of four Multiframes (a V4 Byte occurs once per 4 Frame Multiframe) the following information about the originator of the TU.

a) Shelf Number
b) Card Number
c) Card Type
d) Channel Number
e) Frame Alignment
f) Parity Check Parity Check The Parity check bit is calculated over the previous Multiframe (including itself) and set such that the parity is even.

Data Format order (read left to right, top to bottom) of the V4 message in the multiframe is as follows:

| | BIT NUMBER | | | | | | | | |
|---|---|---|---|---|---|---|---|---|---|
| | 1 | 2 | 3 | 4 | 5 | 6 | 7 | 8 | (time) |
| V4 Byte #1 | P1 | 0 | A1 | 0 | B3 | B2 | B1 | B0 | (500 us) |
| V4 Byte #2 | P2 | 0 | A2 | 0 | C3 | C2 | C1 | C0 | (1.0 ms) |
| V4 Byte #3 | P3 | 0 | A3 | 0 | 0 | D6 | D5 | D4 | (1.5 ms) |
| V4 Byte #4 | P4 | 0 | A4 | 0 | D3 | D2 | D1 | D0 | (2.0 ms) |

Parity Bits P1=1/0 P2=1/0 P3=1/0 P4=1/0 (set as approximate)

Alignment Bits A1=0 A2=1 A3=1 A4=1
Shelf Number B0=1 B1=0 B2=0 B3=0
and Type Bits

| Bits (Type and Number) | C3 | C2 | C1 | C0 |
|---|---|---|---|---|
| Line Card West A | 0 | 0 | 0 | 1 |
| Line Card West B | 0 | 0 | 1 | 0 |
| Line Card East A | 0 | 1 | 0 | 1 |
| Line Card East B | 0 | 1 | 1 | 0 |
| Trib Card A | 1 | 0 | 0 | 1 |
| Trib Card B | 1 | 0 | 1 | 0 |
| Trib Card C | 1 | 0 | 1 | 1 |
| Trib Card D | 1 | 1 | 0 | 0 |
| Protection Trib | 1 | 1 | 0 | 1 |

(The C3 Bit is also referred to as 'Card Type')
Channel Number Mapping 63*2Mbit/s
AU4/FUG-32/TUG-21/TU-12
(CCITT G.709 Multiplexing Structure)

| |
|---|
| D6 TUG-32# Bit 2 (MSB) |
| D5 TUG-32# Bit 1 (LSB) |
| D4 TUG-21# Bit 3 (MSB) |
| D3 TUG-21# Bit 2 |
| D2 TUG-21# Bit 1 (LSB) |
| D1 TU-12# Bit 2 (MSB) |
| D0 TU-12# Bit 1 (LSB) |

Channel Number Mapping 64*2Mbit/s
AU4/TUG-31/TUG-22/TU-12
(Proprietary Mapping Structures

| |
|---|
| D6 TUG-31# Bit 2 (MSB) |
| D5 TUG-31# Bit 1 (LSB) |
| D4 TUG-22# Bit 3 (MSB) |
| D3 TUG-22 Bit 2 |
| D2 TUG-22# Bit 1 (LSB) |
| D1 TU-12# Bit 2 (MSB) |
| D0 TU-12# Bit 1 (LSB) |

The system can be used to receive fault detection by monitoring in the ASIC the V4 Bytes, by the Mapping ASIC on the Trib Cards 2 and by the re-justifier ASIC on the Optical Mux Cards, 1, 3.

Each destination card also has stored in RAM complete details of the originator and channel number of each TU that has been routed to it. When a TU-12 Cross Connection is added the V4 Monitoring is enabled and the V4 Byte of each TU is constantly monitored and compared with the stored information to check for V4 faults.

Any discrepancy between the 'expected' number and the actual values received by the destination card 5 raised as the following V4 Data Fault Conditions.

a) Shelf Number Fault
b) Card Number Fault
c) Card Type Fault
d) Channel Number Fault
e) Frame Alignment Fault
f) Parity Error Fault The individual fault conditions in V4 faults detected are separately selected (enabled) and combined (OR'ed) to produce a single V4 fault condition for each Switch Card, which, after a suitable persistence check, is reported to an Alarms Processing Sub-system and to a Protection Switching Sub-system ) if Switch Card Protection is in use).

The selection of the faults that lead to a V4 Fault condition for the destination cards depends on the System configuration and am shown in the following table.

It is necessary to inhibit some faults not only to stop spurious alarms but also to ensure that unnecessary Switch Card Protection Switching does not occur.

TABLE

| V4 Fault Condition | System Configuration* | | | | |
|---|---|---|---|---|---|
| | 1 | 2 | 3 | 4 | 5 |
| Trib Card 2Mb/s | | | | | |
| Parity Check | enable | enable | enable | enable | enable |
| Shelf Number | enable | enable | enable | enable | enable |
| Card Number | enable | dis | dis | dis | dis |
| Card Type | enable | enable | enable | enable | enable |
| Channel Number | enable | dis | enable | dis | dis |
| Frame Align | enable | enable | enable | enable | enable |
| STM-1 Trib Card | | | | | |
| Parity Check | enable | enable | enable | enable | enable |
| Shelf Number | enable | enable | enable | enable | enable |
| Card Number | enable | dis | dis | dis | dis |
| Card Type | enable | enable | enable | enable | enable |
| Channel Number | enable | dis | enable | dis | dis |
| Frame Align | enable | enable | enable | enable | enable |
| Line Card STM-1 | | | | | |
| Parity Check | enable | enable | enable | enable | enable |
| Shelf Number | enable | enable | enable | enable | enable |
| Card Number | enable | enable | dis | Note 1 | dis |
| Card Type | enable | enable | enable | enable | enable |
| Channel Number | enable | enable | enable | dis | dis |
| Frame Align | enable | enable | enable | enable | enable |

*System Configuration
V4 Monitoring (No other Protection Mechanism in use)
V4 Monitoring when TU Ring Protection is being used.
V4 Monitoring when 1 + 1 STM-1 Protection is being used.
V4 Monitoring when Trib Port Protection is being used.
V4 Monitoring when Trib Card Protection is being used.

A Protection port may be on the same card or on a different card from the one it protects. Only when all protection ports in use are on the same tributary card as the ports they are protecting will the card number be enabled.

Many forms of monitoring are required for the V4 Byte depending on the card arrangement.

Where an ADMX is operating with a single Switch Card this Switch Card will automatically be selected as the 'working' Switch Card. The V4 Monitoring still operates and the V4 Fault condition shall be reported to the Alarm Processing Subsystem. Protection Switching is not possible.

However when the ADMX is operating with Duplicated Switch Cards the V4 monitoring operates and the V4 Fault condition is reported to the Alarm Processing Subsystem and to the Protection Switching Subsystem. The V4 monitoring is one of the criteria used by the Switch Card Protection Subsystem to select the 'working' switch card.

When the ADMX is operating with TU Ring Protection it is necessary to disable the Card and Channel Number faults as these may be caused by the action of the TU Protection Switching mechanism operating.

When the ADMX is operating with STM-1 Line Protection it is necessary to disable the Card Number faults as these may be caused by the action of the Line Protection Switching mechanism operating.

When the ADMX is operating the Trib Port Protection it is necessary to disable the Card and Channel Number faults as these may be caused by the action of the Trib Port Protection mechanism operating.

When the ADMX is operating with Trib Card Protection it is necessary to disable the Board Number faults as these may be caused by the action of the Trib Card Protection mechanism operating.

When operating with dual Switch Cards, the V4 Faults (A and B) are compared and if a difference occurs for longer than a set threshold period the appropriate Switch Card is deemed to have failed.

The Persistence Threshold is configurable by the Operator to be a period of 2,4 7 or 10 Multiframes. The default value is 4.

The operation of the V4 Monitoring process requires a number of commands to pass between the Controller Card and Traffic Cards. When a TU-12 Cross Connection is made the V4 Monitoring Configuration detail download and Enabling/Disabling selection download is generated entirely by the ADMX Controller Card. It is not necessary for the Operator to enter any specific information for V4 Monitoring (eg Which Faults to enable), the details of the Cross Connection is sufficient.

The V4 Monitoring is only enabled when a particular TU12 Cross Connection is made. Enabling of Monitoring shall apply monitoring to both directions of transmission.

When a Cross Connection is set up the Source Cards autonomously insert the required data into the V4 Bytes.

The Configuration details for the Destination cards is downloaded from the Controller Card as part of the overall process of configuring a Cross Connection. Details to be downloaded are:

a) Originator Card Number
b) Originator Shelf Number
c) Originator Card Type
d) TU Channel Number Depending on the overall system configuration the fault conditions leading to a V4 Fault Condition are Enabled/Disabled as given above. Details to be down loaded

| a) Parity Check | Enable/Disable |
|---|---|
| b) Shelf Number | Enable/Disable |
| c) Card Number | Enable/Disable |
| d) Card Type | Enable/Disable |
| e) Channel Number | Enable/Disable |
| f) Frame Align | Enable/Disable |

In order to prevent spurious Alarms the Faults are disabled before a Cross Connection is deleted.

The default (following a Power-up) for fault enabling on all Destination Cards shall be that all (6) faults noted above are disabled. Enabling shall only be possible once a cross connection has been set up.

FIGS. 3 and 4 to which reference is now made show the location of flags within the section overhead protection. Both figures illustrate the switch diagnostic message used, FIG. 3 for AU-4 or TU 31s and FIG. 4 for AU-4/3s or TU-32s. Both figures indicate the section overhead bytes and the byte structures used together with the status flags SF or SD to indicate a system fail or degrade flag as appropriate.

It will be seen from the above that the information in the V4 byte is constantly monitored and a necessary corrective action is taken. It will be apparent that a number of modifications on the use of the information and its treatment will be possible without departing from the scope of the invention.

APPENDIX
Glossary of Terms

| | |
|---|---|
| ASIC | Application Specific Integrated Circuit |
| ADMX | add/drop multiplexer |
| ADMX4 | Generic name for an SMA-4 |
| Admux | See ADMX |
| AUn | Administrative Unit, as defined in ITU specifications G708 and G709. n can be 3 or 4. |
| LSB | Least significant bit - relating to the least significant bit of a binary number. |
| Mbit | Mega bit - i.e. One Million bits |
| MHz | One million Hertz. |
| MSB | Most significant bit-relating to the most significant bit of a binary number. |
| MSP | Multiplexer Section Protection - Protection of the Multiplexer Section as defined in ITU specification G783. |
| ns | Nano second - 1*10E-9 seconds. |
| PSU | Power Supply Unit |
| SDH | Synchronous Digital Hierarchy |
| SMA-4 | Synchronous Multiplexer Add/Drop - 4. An ADMX operating at STM-4 line rate. |
| SOH | Section OverHead. Part of the STM-n frame, as defined in ITU specification G708. |
| STM-1 | Synchronous Transport Module, multiplexing level 1. A signal rate of 155.52 Mbit/s, conforming to ITU specification G708. |
| STM-4 | Synchronous Transport Module, multiplexing level 4. A signal rate of 2488.32 Mbit/s consisting of 16 byte interleaved signals operating at 155.52 Mbit/s. Conforming to ITU specification G708. |
| STM-16 | Synchronous Transport Module, multiplexing level 16. A signal rate of 622.08 Mbit/s consisting of 4 byte interleaved signals operating at 155.52 Mbit/s. Conforming to ITU specification G708. |
| TU | A Tributary Unit, as defined in ITU specifications G708 and G709. |
| V4 byte | A byte located within the Path OverHead of a VC1 or VC2, as defined in ITU specifications G708 and G709. |
| VCn | A Virtual Container, carrying a signal as per ITU specifications G708 and G709. n can be 1, 2, 3 or 4 depending on the bandwidth carried. |

We claim:

1. A telecommunications switch protection arrangement including: a switch including switch paths; means for establishing a switched connection through the switch; a plurality of interface cards including an originating interface card, said cards including a capability of generating and monitoring multiple test data fields and reporting any detected discrepancies; the switched connection comprising a format that includes a test data byte reserved for transporting a multiplicity of different test data fields used to assist in a determination of whether the switch paths are routed and operating correctly; wherein the data fields comprise: a multiframe synchronization pattern; a plurality of parity check bits generated from data carried by said switched connection; a number of a shelf containing the originating interface card; a number of a card position containing the originating interface card; a type number of the originating interface card; and a channel number used by the switched connection to enter the switch.

2. A telecommunications switch protection arrangement as claimed in claim 1, including means for distributing data to the interface card at a destination of a switched connection; the data containing: the shelf number; the card number; the card type; and the channel number of the source of a switched connection.

3. A telecommunication switch protection arrangement as claimed in claim 1, further including means for inhibiting reporting of some or all of the detected discrepancies.

4. A telecommunication switch protection arrangement as claimed in claim 1, wherein the test data byte is a V4 byte of a synchronous digital hierarchy system tributary.

5. A telecommunication switch protection arrangement as claimed in claim 2, further including means for inhibiting reporting of some or all of the detected discrepancies.

6. A telecommunication switch protection arrangement as claimed in claim 2, wherein the test data byte is the V4 byte of a synchronous digital hierarchy system tributary.

7. A telecommunication switch protection arrangement as claimed in claim 3, wherein the test data byte is the V4 byte of a synchronous digital hierarchy system tributary.

8. A telecommunications switch protection arrangement including: a switch including switch paths; means for establishing a switched connection through the switch; a plurality of interface cards including an originating interface and, said cards including a capability of generating and monitoring multiple test data fields and reporting any detected discrepancies; the switched connection comprising a format that includes a test data byte reserved for transporting a multiplicity of different test data fields used to assist in a determination of whether the switch paths are routed and operating correctly; wherein the data fields comprise data which is characteristic of the originating interface card and of a channel used by the switched connection to enter the switch.

* * * * *